Feb. 13, 1968   M. L. ROLLINS   3,368,905
ART OF HYDRATING LIQUID COMBINABLE PRODUCTS
Filed Feb. 11, 1964   2 Sheets-Sheet 1

INVENTOR
MURRAY L. ROLLINS
BY
ATTORNEYS

Feb. 13, 1968   M. L. ROLLINS   3,368,905
ART OF HYDRATING LIQUID COMBINABLE PRODUCTS
Filed Feb. 11, 1964   2 Sheets-Sheet 2
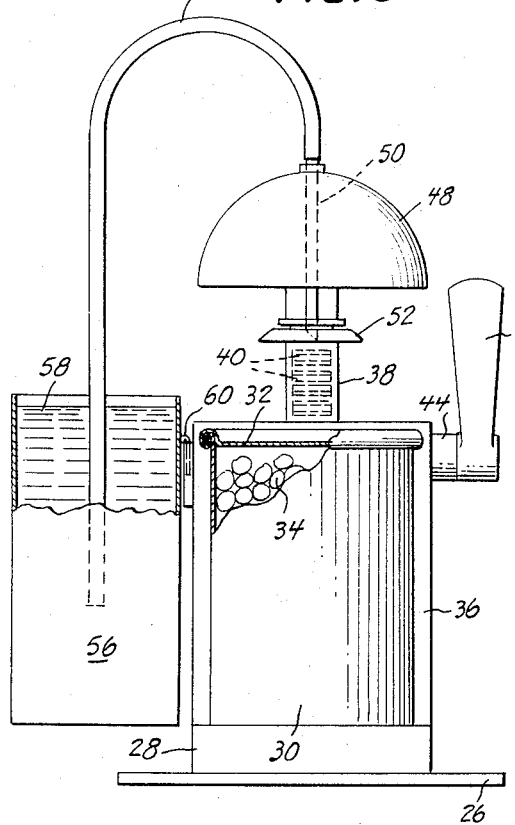
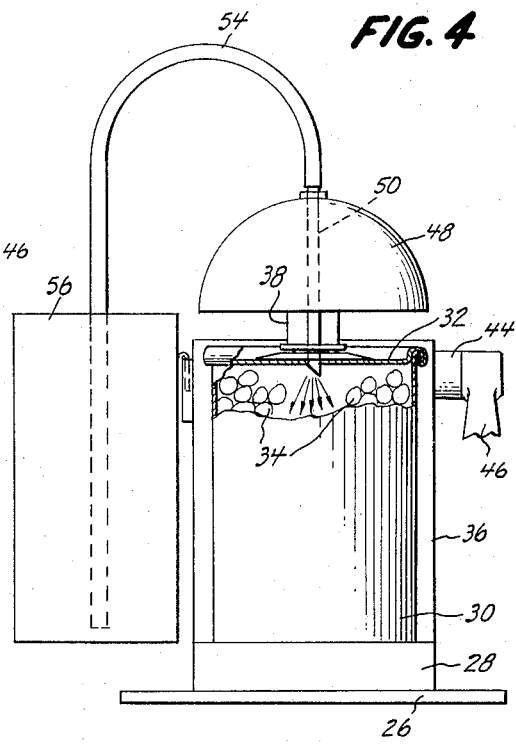
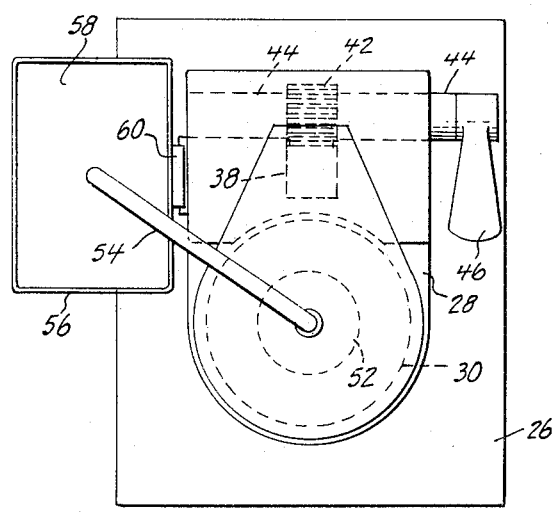
INVENTOR.
MURRAY L. ROLLINS
BY
ATTORNEY United States Patent Office 3,368,905
Patented Feb. 13, 1968

3,368,905
ART OF HYDRATING LIQUID
COMBINABLE PRODUCTS
Murray L. Rollins, Old Tappan, N.J., assignor to General Foods Corporation, White Plains, N.Y., a corporation of Delaware
Continuation-in-part of application Ser. No. 314,734, Oct. 8, 1963. This application Feb. 11, 1964, Ser. No. 346,367
19 Claims. (Cl. 99—104)

The present invention relates to a method of hydrating dehydrated or any liquid combinable products packaged for distribution for sale at retail, this application being a continuation-in-part of my pending application Ser. No. 314,734 filed Oct. 8, 1963, now abandoned.

The term "hydrating" as employed herein is intended to denote the combining with or impregnation of products by a liquid substance such as water. The term is intended to include the saturation or wetting of a nonsoluble solid which has been dehydrated under any possible condition, whether it be under atmospheric pressure, a vacuum, or while in a frozen state. The term also includes the impregnation of solids having soluble elements which are extracted from the solid to become infused with the liquid, such a product being ground coffee, tea, or the like. The term is also intended to include the combining of liquid with a soluble product which has been either dehydrated so as to be in the form of a dry powder such as is now commonly known as instant (soluble) coffee, tea, or the like, or which is a soluble substance or combination of ingredients not previously dehydrated, such as artificial fruit juices or the like.

By the same token, the terminology "liquid combinable" is intended to embrace all products which when combined with a liquid results in or produces a product of the desired consistency, whether it be a dehydrated nonsoluble solid, a solid having soluble elements extractable by the liquid, or a soluble solid which may be either a liquid in dehydrated form or any substance which is completely solubilized when combined with a reconstituting liquid such as water or the like.

Dried fruits, vegetables, beverages and other commodities intended to be hydrated and cooked or simply hydrated as product offer a considerable advantage to the manufacturer as well as the consumer. The manufacturer enjoys savings in weight and the cost of distribution of a substantially dehydrated product. The product per se is usually hydratable to a preferred quality in terms of flavor, color, concentration and other values. The ability to control these qualities is appreciated by most consumers.

In the case of freeze dried fruits and vegetables, these products generally are characterized by a structure having a network of intercommunicating voids from which the moisture has been removed to be replaced by pockets of air. As a consequence, the freeze dried product is quite light and, in many cases, quite fragile and likely to break up incident to rehydration. Most freeze dried specimens are relatively slow to rehydrate when subjected to quiescent recipe conditions such as are typified when the freeze dried product is placed in an excess of cold or hot water. Generally, some amount of overt stirring and physical immersion through the use of a suitable kitchen utensile is required in order that the entire surface of the product will be exposed to moisture. The density of freeze dried products is less than that of all reconstituting liquids, e.g., water. As a consequence, the freeze dried product will float therein. This, coupled with the fragile structure of the freeze dried product, offers a specimen which will only gradually pick up that level of water required to provide the desired eating quality, unless resort is made to stirring which is likely to break up or at least bruise the product.

In the case of fruits and vegetables which are dried by other than freeze-drying techniques which may be under vacuum or at atmospheric pressure and including drum-drying methods or spray-drying methods, these products are generally characterized by a flaky, granular, or powdery structure the individual particles of which are also lighter than the reconstituting liquid which tends to prolong the rehydration process. Furthermore, the tendency of the individual particles of this type to adhere to one another results in the particles remaining in a relatively compact mass wherein the voids between the individual particles are extremely small and thus tend to impede the impregnation of the mass by the reconstituting liquid.

In the case of beverage producing products which, per se, are not generally considered to be edible, such as ground coffee, tea, or the like, but which are comprised of water soluble constituents, hydration thereof for the purpose of extracting the water-soluble constituents is impeded by the many minute voids comprising air pockets both within the individual particle and between the several particles comprising the product.

The same factors are also present in the case of fully soluble products which are hydratable to produce a beverage, whether the product be a fully dehydrated beverage such as instant (soluble) coffee, tea, or the like, or a mixture of a synthetic flavoring with a sweetener which is hydratable to produce an artificial beverage similar to natural fruit juice, coffee, or the like.

It is an object to the present invention to accelerate the rate of hydration of liquid combinable products in a simple and yet efficacious manner.

A further object of the invention is to accelerate the hydration of such products in a manner such as assures that the products will retain their structural integrity during the process of hydrating them.

In accordance with the present invention a liquid combinable fruit, vegetable, meat, dairy, beverage product or other such article intended to be hydrated or cooked, that is, warmed to an edible consistency, is packaged in a container under a vacuum and means are provided whereby it may be opened while the container and the contents thereof are in liquid-tight communication with the body of reconstituting liquid used for hydrating purposes. Typically, in accordance with one embodiment a can of fruit or vegetable having a frangible seal at one end thereof is provided, and the can end with the frangible seal is immersed in the reconstituting liquid. The frangible seal is then ruptured. By reason of the differential in pressure between the atmosphere and that existing in the can, the reconstituting liquid enters the can immediately under atmospheric pressure. It has been noted that under these conditions the product will hydrate much more rapidly than the same product immersed under atmospheric conditions in an excess of reconstituting liquid.

The invention will now be more fully described and understood by reference to the accompanying drawings wherein:

FIG. 3 is a front elevation of an easy opening mechanism which may be utilized in practicing another embodiment of the invention;

FIG. 4 is a view similar to FIG. 3 showing the mechanism in its activated condition;

FIG. 5 is a plan view of the mechanism shown in FIG. 3.

Figure 1:
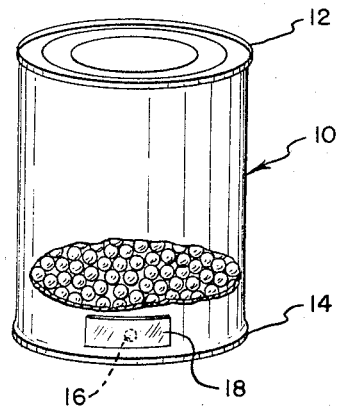
FIG. 1 shows a container which may be used in practicing the present invention and adapted to be opened with the container contents hydrated therein.

Referring to the drawing, freeze dried green peas are shown packaged in a cylinder wherein the peas are adapted to be rehydrated. The can comprises a cylindrical body portion 10 having disc-like end portions 12 and 14 seamed to the can body in the conventional manner. At one end of the can body there is made a relatively small opening 16 over which is located a patch 18 which may be a metallic foil, plastic film or the like easily frangible material and which is affixed to the can body and adapted to be punctured when the can is in water. The patch and the can body itself is of a design whereby the can will maintain the container contents under a vacuum therein throughout the anticipated period of packaging, distribution and storage prior to usage by the consumer. Vacuumizing may be accomplished after filling with product either when the last end portion is seamed to the can body or at the time the patch 18 is affixed.

Figure 2:
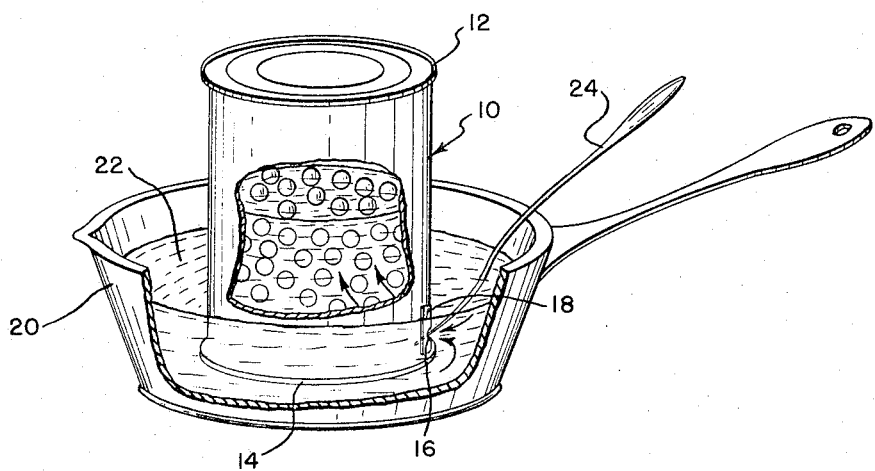
FIG. 2 shows the container contents in the process of being hydrated, the liquid entering it once the frangible seal has been ruptured.

Referring now to FIG. 2, the consumer simply immerses the can in a suitable kitchen utensil, e.g., the pot generally shown as 20 having a quantity of reconstituting liquid 22. The end of the can having the hole 16 therein is immersed beneath the surface of the reconstituting liquid, and another kitchen utensil such as a fork generally shown as 24 is employed to break the frangible structure of the patch 18. As will be seen in FIG. 2, the container contents, being under a vacuum, "suck-in" the rehydrating liquid until the same substantially fills the void space in the container.

The term void space is used herein to connote the voids existing between the individual particles of the dried specimen in the can or other container as well as the voids within those specimens per se. Most dried products will reconstitute or rehydrate in the can to their original moisture content prior to being dehydrated.

The invention will lend itself quite advantageously to the preparation of freeze dried fruits, vegetables, milk and cheese products, meat, sea foods and the like containing various quantities of water soluble and water insoluble constituents. In general, the freeze dried product will, as indicated above, be characterized by a porous vesicular structure, i.e., having intercommunicating voids. Some products will have a relatively dense integument such as in the case of peas shown in the accompanying drawing, and the benefits of the present invention will be particularly enjoyed in the case of such products.

The advantages accruing from the foregoing rehydration concept, in the case of freeze dried products, are mainly rapidity and uniformity of rehydration to the desired eating consistency and completeness of rehydration without collateral oversoftening of the exterior portions of the freeze dried specimen. In the case of a freeze dried product which may comprise a combination of protein pieces such as shrimp, crab, lobster, chicken or the like with a complementary freeze dried sauce portion, such as wine sauce, Newburgh sauce, or the like, the concept herein disclosed is particularly advantageous. Heretofore the rehydration of such a combined product presented problems in that the sauce portion would rehydrate very rapidly and because of its water holding ability would severely retard or even prevent rehydration of the discrete protein particles. Due to the extremely rapid rehydration that is obtained of the protein particles by practice of the novel process herein disclosed, the protein particles are fully rehydrated before the sauce portion has an opportunity to obtain a saucelike consistency, the overall result providing a product excellent in all respects.

In the case of all liquid combinable products, by packaging the container contents under a vacuum, introduction of hydrating liquid to the void spaces of the product occurs substantially uniformly. Moisture is caused to permeate the specimen uniformly throughout and not just at the surface portions thereof. By virtue of the vacuum established within the product per se the pressure differential between the interior of the product and the reconstituting liquid is such that the product will admit and imbibe any level of moisture required to reconstitute or hydrate the product specimens, there being virtually no resistance to imbibition.

Hydration in accordance with the present invention can be distinguished from hydration of products which have been exposed to atmospheric pressure. Under atmospheric conditions, the product will admit and retain air which occupies the void space throughout and between the specimens, the hydrating liquid being thereby temporarily impeded and caused to permeate the product merely by reason of ability of the product to imbibe sufficient water in gradual increments proceeding from the outside portions of the product inwardly. The functioning of the present hydration procedure may be characterized as "forced hydration" wherein, after a substantial evacuation of gas from the void spaces of the product as it is subjected to aspiration incident to vacuum packaging, pressure of the atmosphere is employed with hydrostatic pressure on the hydrating liquid which in turn is caused to penetrate the evacuated void spaces and hydrate the solid constituents of the specimen uniformly throughout.

The foregoing should not be understood to foreclose the presence of an inert gas such as nitrogen within the container. Indeed in some applications it may be desirable to employ some inert gas such as nitrogen incident to the vacuumizing of the container content in order to insure the substantial purging of oxygen and/or atmospheric moisture therefrom. What is essential is that there be sufficient evacuation of occluded gas within vesicles of the packaged product to permit entry of hydrating liquid, that the package material per se be pressure tight during the anticipated stresses of handling and storage, and that the pressure differential between the atmosphere and that which exists within the container at the point of intended admission of the liquid to the product be sufficient to promote the aforesaid forced hydration.

As indicated previously, the invention is not to be restricted to any particular form of package. It is preferred, however, that the package be of a relatively constant volume wherein the contained material is packaged to only partially occupy the contents thereof, the relationship of the ingredients and the volume of the package being predetermined so that the hydrated product will swell to the intended bulk volume in the can without excessive expansion such as would cause compression of the product. The criticality for such preselection of the volume of charge material relative to the void space of the container itself will vary from product to product depending upon structural strength of the hydrated specimen and the extent to which it swells during hydration.

The invention is not restricted, however, to embodiments wherein the container contents are only partially filled since it is also practicable for some applications employing flexible packaging material to fully charge the package with the hydratable product, the flexible packaging material being designed to revert or return to its normal unflexed shape and thereby accommodate the expanded hydrated volume of goods.

In accordance with one embodiment of the invention, it is suggested that the package have incorporated therein readily openable closure, such as the patch 18, constituting an easy opening means whereby the contents can be exposed to hydrating liquid without previous exposure to the atmosphere, since otherwise air will be instantaneously admitted to the package contents as the closure is opened and will materially reduce the rate of hydration.

Other embodiments of the invention will call for introducing reconstituting or hydrating liquid under conditions wherein entry of air incident to opening the container contents is avoided without incorporating a readily openable feature in the container structure itself. For example, a suitable device, incorporating mechanical principles so as to constitute an easy opening means, connected to a source of liquid and in continuous communication therewith, may be used to open the container and simultaneously bring the container contents into communication with the liquid source under atmospheric pressure or a pressure at least greater than that inside the container, whereby the liquid will be caused to uniformly hydrate the vacuum-packaged liquid combinable material.

Such a device is illustrated in FIGS. 3, 4 and 5 wherein is shown an easy opening mechanism which does not require any alteration or modification in the container itself. Such a device may comprise a base plate 26 carrying a platform 28 adapted to support a container or can 30 having a conventional end closure 32 and vacuum packed with a product 34 which may be dried peas or any other liquid combinable product. Mounted on the rear end of platform 28 is an upright frame housing 36 which serves to support guide for vertical movement a rack 38, the rear face of which is formed with teeth 40 in meshing engagement with the teeth of a gear 42. Gear 42 is carried on a shaft 44 mounted in the upper portion of the housing 36 and supporting at its outer end a handle 46. Suitably secured to the upper end of the rack 38 is a puncturing assembly including a dome shaped cover 48 and an upright rigid tube 50, the lower end of the which extends below the cover 48 and is pointed to serve as an instrument for puncturing the end closure 32 of the can 30. Mounted on the tube 50 near its lower end is a resilient sealing gasket 52 which hermetically seals a discrete area of the closure end 32 prior to the puncturing thereof when the puncturing assembly is lowered from its inactive position of FIG. 3 to its active position of FIG. 4. Actuation of the puncturing assembly is accomplished by rotation of the handle 46.

The upper end of the rigid tube 50 is connected to a flexible tube 54 which runs to a tank 56 containing a reservoir of hydrating liquid 58, the tank being suitably supported by the housing 36, preferably by detachable means such as the tonque and slot fitting 60 so as to enable the tank 58 to be removed, if desired, for filling purposes. Upon actuation of the puncturing assembly from the FIG. 3 to the FIG. 4 position, atmospheric pressure acting on the reservoir of hydrating liquid 58 forces it through the flexible tube 54 and rigid tube 50 into the interior of the container 30 to thereby hydrate the contained product in accordance with the forced hydration concept of the instant invention. The use of a device such as above described is partically advantageous in applications where the hydrating liquid is preheated for the purpose of elevating the temperature of or cooking the product incident to hydration thereof. By use of the device, the necessity for manually holding or handling the container during the hydration process is completely avoided, this being of particular advantage since heating of the product results in heating of the container 30 which could be to a degree beyond human tolerance unless some form of insulation were provided.

In all of these applications, the vacuum drawn on the container need only be that amount required to evacuate gas from the product and provide a sufficient pressure differential between the interior of the container and the atmosphere ot promote rapid and uniform hydration. For most applications rather conventional moderate degrees of vacuum may be practiced such as do not call for a significant modification in the design of the packaging material. The degree of vacuum drawn on the container will vary to some extent with the recipe called for in hydrating the container contents to the condition intended; for most products intended to be simply hydrated in cold water, the container will be vacuumized to a greater extent than in the case of goods intended to be both hydrated and warmed, it being found that the degre of vacuum called for to substantially hydrate a cold or ambient preparation of product is greater. Typically, the container contents will be vacuumized to have absoulate pressure in the order of 27 ins. (Hg), the degrees of vacuum varying in accordance with the intended increase in moisture content. For most products hydrated with cold water a vacuum in the order of 27 ins. (Hg) will be preferred since this results in complete hydration. If, however, the recipe intended calls for warming of the container contents after hydration, the degree of vacuum necessarily employed will be less, it being found that in such cases hydration is promoted significantly by the elevation of temperature in the hydrating liquid; a common level of vacuum for most hot water preparations which subsequently involve heating through hydrating liquid to a product temperature in the neighborhood of 160°–212° F. will be in the neighborhood of 10 to 15 ins. (Hg). Typically, the container contents will be vacuumized to have an absolute pressure of less then 27 ins. (Hg) a more common level of vacuum being from 10 to 17 ins. (Hg).

The present invention will find one advantageous application in the case of freeze dried products which ordinarly call for slow freezing of the product prior to freeze drying in order to promote the formation or large water ice crystals therein, which crystals in turn produce a product which is highly porous as required for normal rehydration. By virtue of the improved rehydration properties afforded freeze dried products when packaged in accordance with this invention, such products may be more rapidly frozen and hence have created therein smaller water ice crystals which thereby assure a cellular texture more closely proximating that of the product prior to freezing. For many products such as strawberries whose turgidity is seriously modified by slow freezing, therefore, the product will be rapidly frozen, i.e., in a period less than one hour prior to freeze drying.

It will be understod that while the invention has been described with partically reference to the above example, the invention is not necessarily limited thereto. Reference should therefore be had to the appended claims for a definition of the limits of the invention.

What is claimed is:

1. In the art of hydrating a liquid combinable product packaged under vacuum within a vacuum sealed container directly in contact with and solely enclosing said product, the improvement which comprises, breaking open the vacuum seal of said container at a discrete area in the surface of said container by actuation of easy opening means, and maintaining the opening at said discrete area in communication solely with a hydrating liquid under a pressure greater than the interior pressure of said container, whereby said liquid is caused to enter said container and hydrate said product under the force of the differential in pressure between that on said liquid and that within said container.

2. The invention according to claim 1 including the step of interrupting the communication between said opening and said liquid after equalization of the pressure within said container and the pressure on said liquid.

3. The invention according to claim 1 wherein said nydrating liquid is maintained at atmospheric pressure.

4. The invention according to claim 1 including the step of preheating said hydrating liquid, whereby the temperature of said product is elevated in conjunction of the hydration thereof by said liquid.

5. In the art of hydrating a liquid combinable product, the improvement which comprises, packaging said product under vacuum in a vacuum sealed container directly in contact with and solely enclosing said product, breaking open the vacuum seal of said container at a discrete area in the surface of said container by actuation of easy opening means, and maintaining the opening at said discrete area in communication solely with a hydrating liquid under a pressure greater than the interior pressure of said container, whereby said liquid is caused to enter said container and hydrate said product under the force of the differential in pressure between that on said liquid and that within said container.

6. The invention according to claim 5 including the step of interrupting the communication between said opening and said liquid after equalization of the pressure on said liquid and the pressure within the container.

7. The invention according to claim 5 wherein said liquid is exposed to atmospheric pressure.

8. The invention according to claim 5 including the step of preheating said liquid to a temperature sufficient to effect cooking of said product in conjunction with the hydration of said product.

9. The invention according to claim 5 wherein the packaging of said product comprises the partial filling of said container with said product to leave a void space within said container after being vacuum sealed.

10. The invention according to claim 9 wherein the hydration of said product increases the volume of the product to cause a corresponding decrease in the area of said void space.

11. The invention according to claim 5 wherein the temperature of said hydrating liquid is maintained at a level no greater than the temperature of said product.

12. The invention according to claim 5 wherein the temperature of said hydrating liquid is maintained at a level higher than the temperature of said product to thereby elevate the temperature of said product in conjunction with the hydration thereof.

13. In the art of hydrating a liquid combinable product packaged under vacuum within a vacuum sealed container, the improvement which comprises, breaking open the vacuum seal of said container at a discrete area in the surface of said container by actuation of an easy opening means, the actuation of said easy opening means including the step of pushing an instrument against said discrete area with a force sufficient to puncture the vacuum sealed enclosure defined by said container, and maintaining said discrete area in communication solely with a hydrating liquid under a pressure greater than the interior pressure of said container, whereby said liquid is caused to enter said container through the puncture and hydrate said product under the force of the differential in pressure between that on said liquid and that within said container.

14. The invention according to claim 13 wherein said discrete area of said container is held submerged within a body of said hydrating liquid while said container is being punctured.

15. The invention according to claim 9 wherein the vacuum packaging of said product includes the step of affixing to said container an air-impervious patch over a perforated section at said discrete area in the wall of said container.

16. The invention according to claim 15 wherein the actuation of said easy opening means includes the step of pushing an instrument against said patch with a force sufficient to puncture said patch.

17. The invention according to claim 16 wherein said discrete area covered by said patch is held submerged within a body of hydrating liquid while said patch is being punctured.

18. The invention according to claim 13 including the step of forming an airtight seal between said instrument and said discrete area prior to puncturing by said instrument, and maintaining said seal during and subsequent to the puncturing of said container by said instrument.

19. The invention according to claim 18 wherein said hydrating liquid is introduced into said container by said instrument through the puncture at said discrete area from a body of said hydrating liquid maintained out of contact with the exterior surface of said container.

References Cited

UNITED STATES PATENTS

| 1,121,007 | 12/1914 | Ginaca | 99—100 |
| 2,689,182 | 9/1954 | Richert | 99—100 |

HYMAN LORD, *Primary Examiner.*

A. LOUIS MONACELL, *Examiner.*

M. VOET, *Assistant Examiner.*